United States Patent
Sato et al.

(10) Patent No.: US 8,588,874 B2
(45) Date of Patent: Nov. 19, 2013

(54) MOBILE DEVICE

(75) Inventors: Yutaka Sato, Kawasaki (JP); Yusuke Mizuno, Kawasaki (JP); Ikki Tatsukami, Kawasaki (JP); Manabu Sotodate, Kawasaki (JP); Hiroki Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 182 days.

(21) Appl. No.: 13/235,788

(22) Filed: Sep. 19, 2011

(65) Prior Publication Data
US 2012/0220352 A1 Aug. 30, 2012

(30) Foreign Application Priority Data

Feb. 25, 2011 (JP) .................................. 2011-40664

(51) Int. Cl.
*H04M 1/00* (2006.01)
*H04B 1/38* (2006.01)
*H04M 1/02* (2006.01)

(52) U.S. Cl.
CPC ........... *H04M 1/0237* (2013.01); *H04B 1/3833* (2013.01)
USPC ........ 455/575.4; 455/90.3; 455/347; 455/348

(58) Field of Classification Search
USPC .............. 455/575.4, 90.3, 117, 347, 348, 349
See application file for complete search history.

(56) References Cited

U.S. PATENT DOCUMENTS

| | | | |
|---|---|---|---|
| 7,840,241 B2 * | 11/2010 | Kim ............................ | 455/575.1 |
| 8,121,659 B2 * | 2/2012 | Vesamaki ................... | 455/575.4 |
| 8,155,718 B2 * | 4/2012 | Byun et al. ................. | 455/575.4 |
| 8,265,721 B2 * | 9/2012 | Amano ........................ | 455/575.4 |
| 2009/0029741 A1 * | 1/2009 | Satou et al. .................. | 455/566 |
| 2009/0163258 A1 * | 6/2009 | Vesamaki ................... | 455/575.4 |
| 2010/0151924 A1 * | 6/2010 | Amano ........................ | 455/575.4 |

FOREIGN PATENT DOCUMENTS

| | | |
|---|---|---|
| JP | 9-134228 A | 5/1997 |
| JP | 2010-087986 A | 4/2010 |

* cited by examiner

*Primary Examiner* — Duc M Nguyen
(74) *Attorney, Agent, or Firm* — Fujitsu Patent Center

(57) ABSTRACT

A mobile device includes a first housing, a second housing, a bias member, a first stopper and a second stopper. The second housing is slidably coupled to the first housing in a sliding range. The bias member biases the second housing from a middle position of the sliding range to one end of the sliding range. The first stopper is provided on the first housing, is connected to a ground of the first housing, and has electrical conductivity. The second stopper is provided on the second housing, has electrical conductivity, and comes into contact with the first stopper to define the one end of the sliding range.

6 Claims, 5 Drawing Sheets

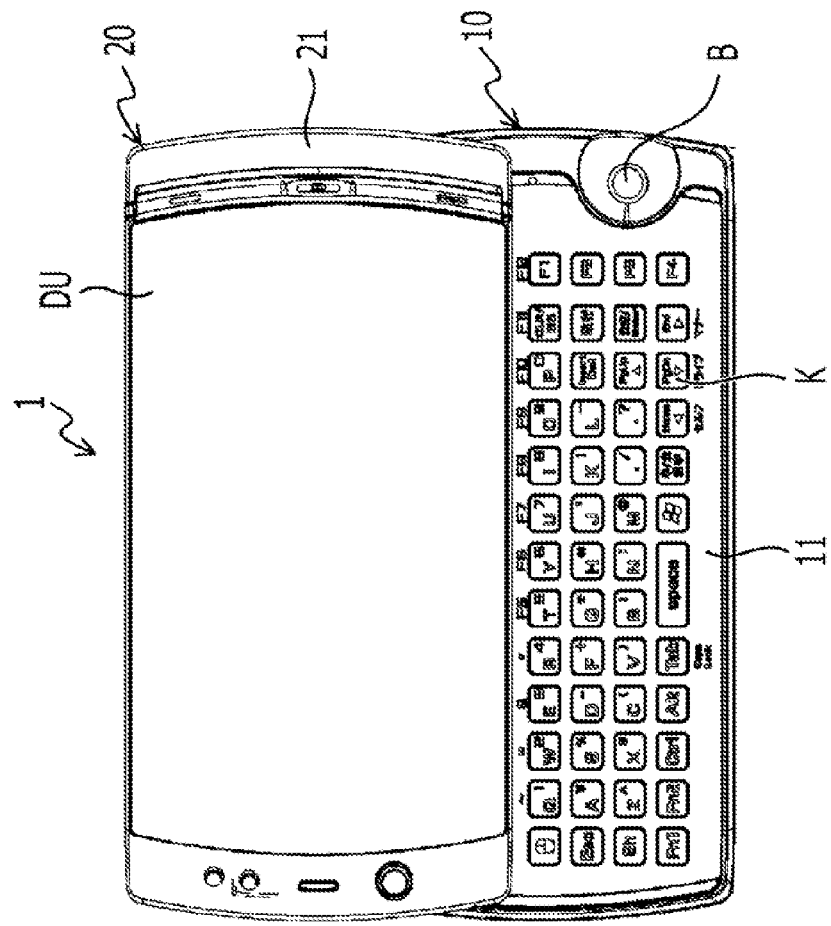
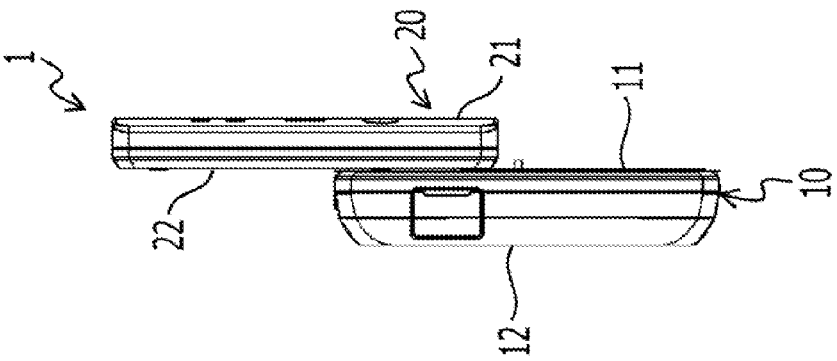

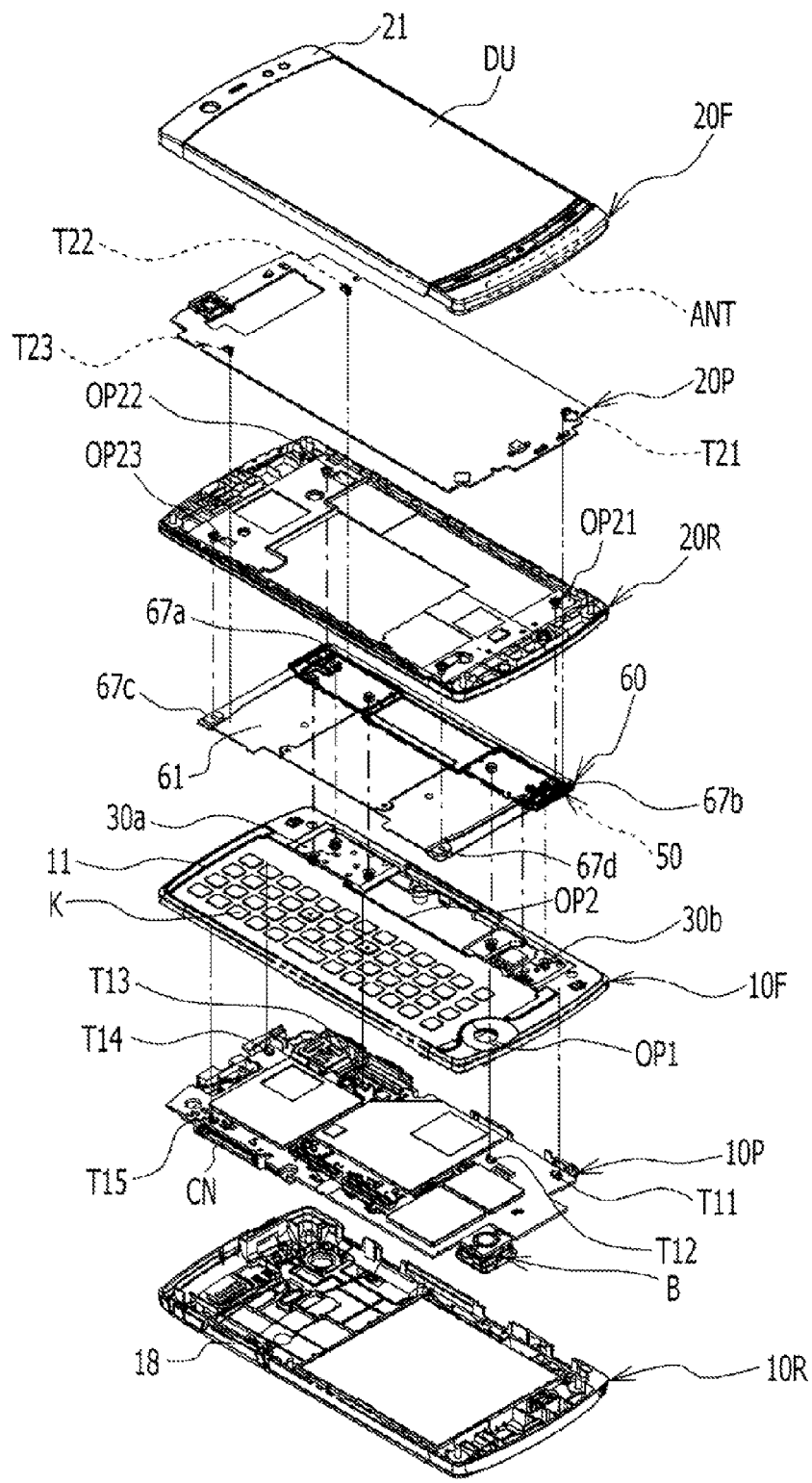

MOBILE DEVICE

CROSS-REFERENCE TO RELATED APPLICATIONS

This application is based upon and claims the benefit of priority from the prior Japanese Patent Application No. 2011-40664 filed on Feb. 25, 2011, the entire contents of which are incorporated herein by reference.

FIELD

Embodiments of the present invention relate to a mobile device.

BACKGROUND

A mobile device having a first housing and a second housing slidably coupled to the first housing in a sliding range is known. The mobile device is provided with a stopper for defining the sliding range. The mobile device is also provided with a separate electrically conductive member for connecting the ground of the first housing with the ground of the second housing. The electrically conductive member electrically connects the grounds of the first and the second housings to each other when the second housing is at one end or the other end of the sliding range.

The stopper and the electrically conductive member are separately provided in the mobile device, so the number of components increases.

SUMMARY

According to an embodiment, a mobile device includes a first housing, a second housing, a bias member, a first stopper and a second stopper. The second housing is slidably coupled to the first housing in a sliding range. The bias member biases the second housing from a middle position of the sliding range to one end of the sliding range. The first stopper is provided on the first housing, is connected to a ground of the first housing, and has electrical conductivity. The second stopper is provided on the second housing, has electrical conductivity, and comes into contact with the first stopper to define the one end of the sliding range.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the various embodiments.

BRIEF DESCRIPTION OF THE DRAWINGS

FIGS. 2A and 2B are illustrations of the mobile phone of the embodiment.

FIG. 3 is an exploded perspective view of the mobile phone.

DETAILED DESCRIPTION OF AN EMBODIMENT

Figure 1A:
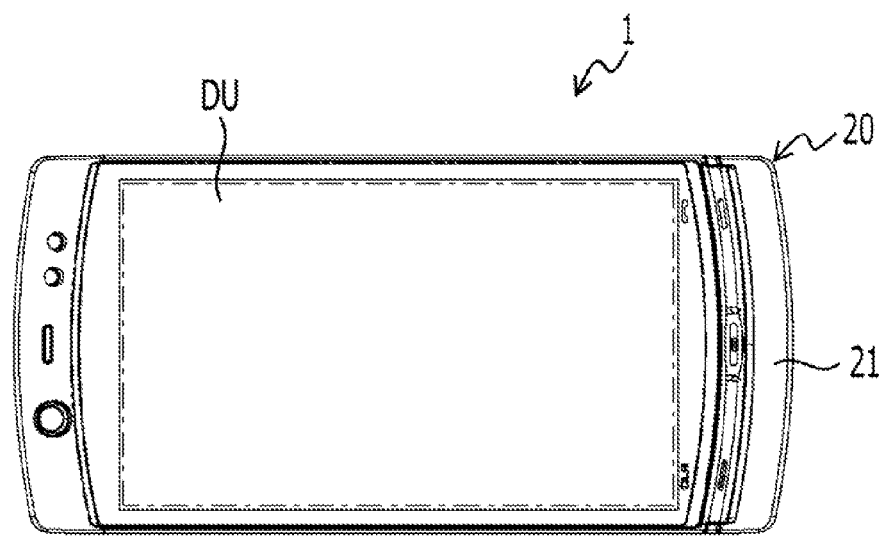
FIGS. 1A and 1B are illustrations of a mobile phone of an embodiment.
Figure 1B:
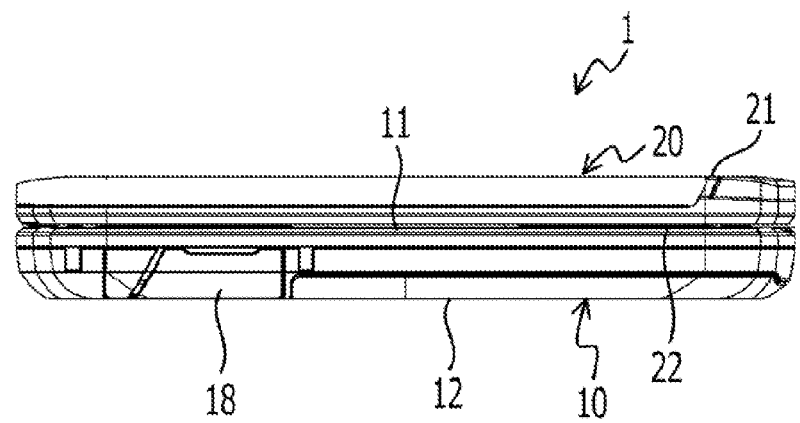

In an embodiment, a mobile phone will be described as an example of a mobile device. FIGS. 1A, 1B, 2A, and 2B are illustrations of the mobile phone of the embodiment. The mobile phone has housings 10 and 20. The housings 10 and 20 are slidably coupled to each other. In other words, the housings 10 and 20 overlap each other and are openably and closably connected to each other. The housing 10 is an example of a first housing. The housing 20 is an example of a second housing slidably coupled to the first housing in a sliding range. FIGS. 1A and 1B show a mobile phone 1 in a closed state. FIGS. 2A and 2B show the mobile phone 1 in an open state. FIGS. 1A and 2B are front views of the mobile phone 1. FIG. 1B is a view of the mobile phone 1 as seen from below. FIG. 2A is a view of the mobile phone 1 as seen from the side.

The housing 10 has a front surface 11 and a rear surface 12. The housing 20 has a front surface 21 and a rear surface 22. In the closed state, the front surface 11 of the housing 10 faces the rear surface 22 of the housing 20. In the open state, that is, in a state in which the housing 20 slides with respect to the housing 10, the front surface 11 of the housing 10 is exposed. A keyboard K and a trackball B for operating the mobile phone 1 are provided on the front surface 11 of the housing 10. The keyboard K and the trackball B are for operating the mobile phone 1. The keyboard K and the trackball B are an example of an operation unit whose exposure state changes according to sliding of the housing 20 with respect to the housing 10. A display unit DU for displaying a desired image according to an operation is provided on the front surface 21 of the housing 20. The display unit DU is an example of a display exposed without sliding the housing 20 with respect to the housing 10. As shown in FIG. 1B, a cover 18 for exposing a connector CN described below is provided on a lower side surface of the housing 10.

FIG. 3 is an exploded perspective view of the mobile phone 1. As shown in FIG. 3, the housing 10 has a front case 10F and a rear case 10R. The front case 10F demarcates the front surface of the housing 10. The rear case 10R demarcates the rear surface of the housing 10. A printed board 10P and the trackball B are accommodated between the front case 10F and the rear case 10R. The trackball B is formed on the front surface 11 of the front case 10F and operably exposed from an opening OP1. The connector CN is mounted on the printed board 10P. The connector CN can be connected, for example, to a battery charger for charging a battery of the mobile phone 1.

The housing 20 has a front case 20F and a rear case 20R. The front case 20F demarcates the front surface of the housing 20. The rear case 20R demarcates the rear surface of the housing 20. A printed board 20P is accommodated between the front case 20F and the rear case 20R. The printed boards 10P and 20P respectively have a ground layer. An antenna ANT for performing wireless communication is fixed inside the front case 20F. The antenna ANT is a thin plate member made of a metal. The antenna ANT is connected to a power feeding pattern formed on the printed board 20P. Terminal portions T11 to T15 are provided on the surface of the printed board 10P facing the front case 10F. The terminal portions T11 to T15 are electrically connected to the ground layer of the printed board 10P. Similarly, terminal portions T21 to T23 are provided on the surface of the printed board 20P facing the rear case 20R. The terminal portions T21 to T23 are electrically connected to the ground layer of the printed board 20P.

A fixed plate 50 is fixed on the front surface 11 of the housing 10. A sliding plate 60 is fixed on the rear surface 22 of the housing 20. The fixed plate 50 and the sliding plate 60 respectively have a substantially flat plate shape. The sliding plate 60 has substantially the same area as that of the rear surface 22 of the housing 20. The fixed plate 50 has a size such that the fixed plate 50 is hidden by the housings 10 and 20 even when the mobile phone 1 is in the open state. Therefore, the fixed plate 50 is smaller than the sliding plate 60. The sliding plate 60 is slidably coupled to the fixed plate 50 in a sliding range. Thereby the housing 20 is slidably coupled to the housing 10 in a sliding range. Therefore, the fixed plate 50 and the sliding plate 60 have a function to slidably couple the housings 10 and 20 together. The fixed plate 50 and the sliding plate 60 are made of an electrically conductive metal.

Metal plates 30a and 30b are arranged on the front case 10F which is an upper portion of the keyboard K. An opening OP2 is formed between the metal plate 30a and the metal plate 30b. A part of the fixed plate 50 is fitted into the opening OP2 and the fixed plate 50 is connected to the metal plates 30a and 30b. The fixed plate 50 is fixed so that the fixed plate 50 overlaps the metal plates 30a and 30b. The metal plates 30a and 30b are made of an electrically conductive metal. As shown in FIG. 2B, the fixed plate 50 and the metal plates 30a and 30b are hidden by the housings 10 and 20 even in the open state.

The terminal portions T11 and T12 are connected to the metal plate 30b. The terminal portion T13 is connected to the metal plate 30a. Terminal portions T14 and T15 are connected to a metal plate (not shown in the drawings) disposed on the rear surface of the front case 10F. The metal plate (not shown in the drawings) is connected to the metal plate 30a. As described above, the fixed plate 50 is fixed to the metal plates 30a and 30b. Thereby, the ground layer of the printed board 10P is electrically connected with the fixed plate 50. The terminal portions T21 to T23 are electrically connected to the sliding plate 60 via openings formed in the rear case 20R. Thereby, the ground layer of the printed board 20P is electrically connected with the sliding plate 60.

Figure 4A:
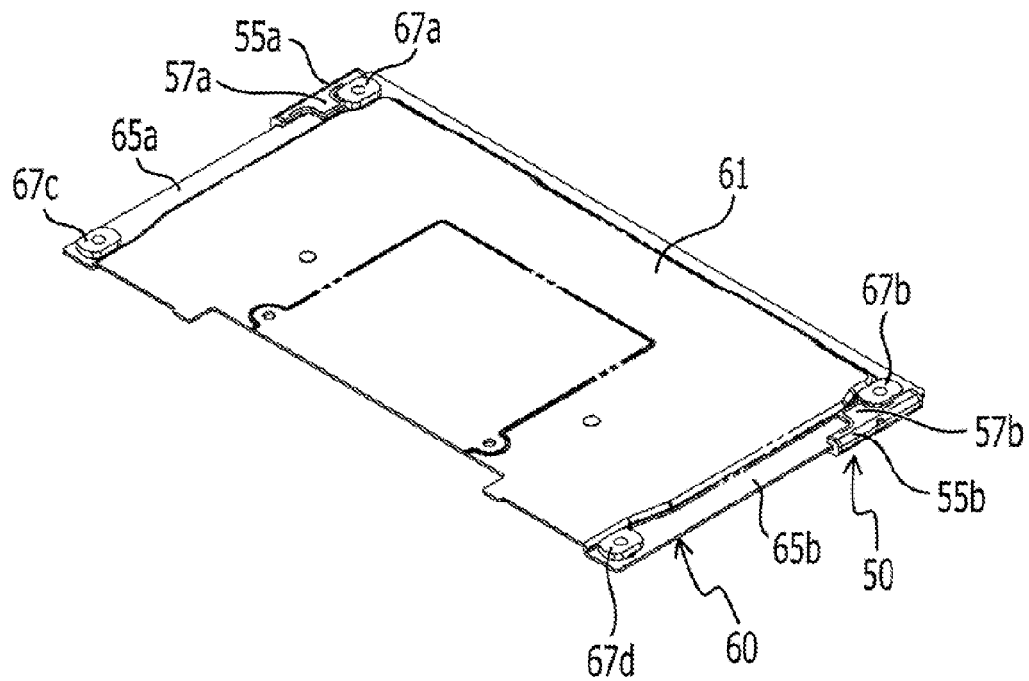
FIGS. 4A and 4B are illustrations of a fixed plate and a sliding plate when the mobile phone is in a closed state.
Figure 4B:
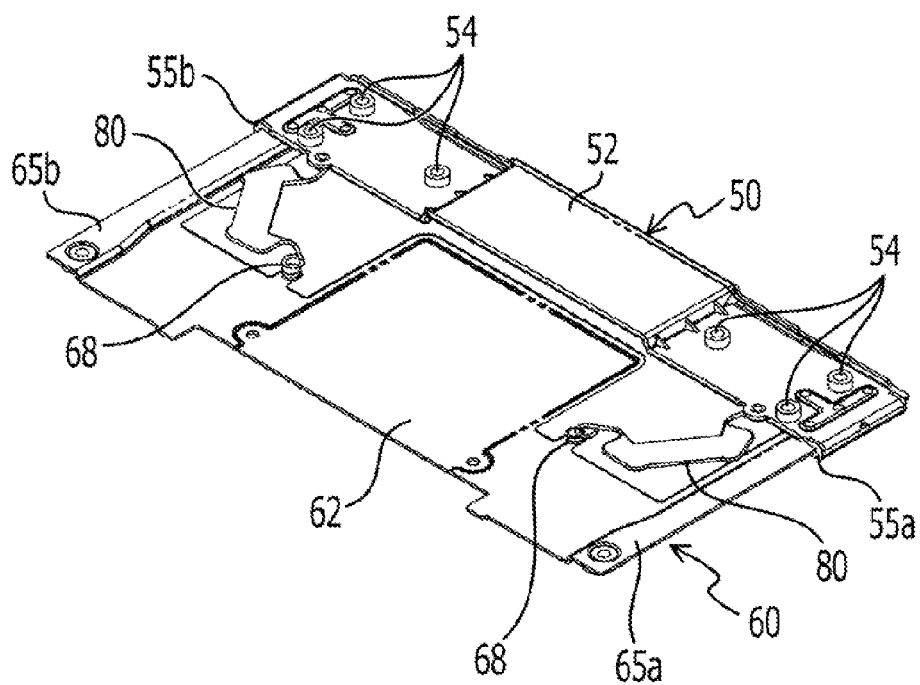
Figure 5A:
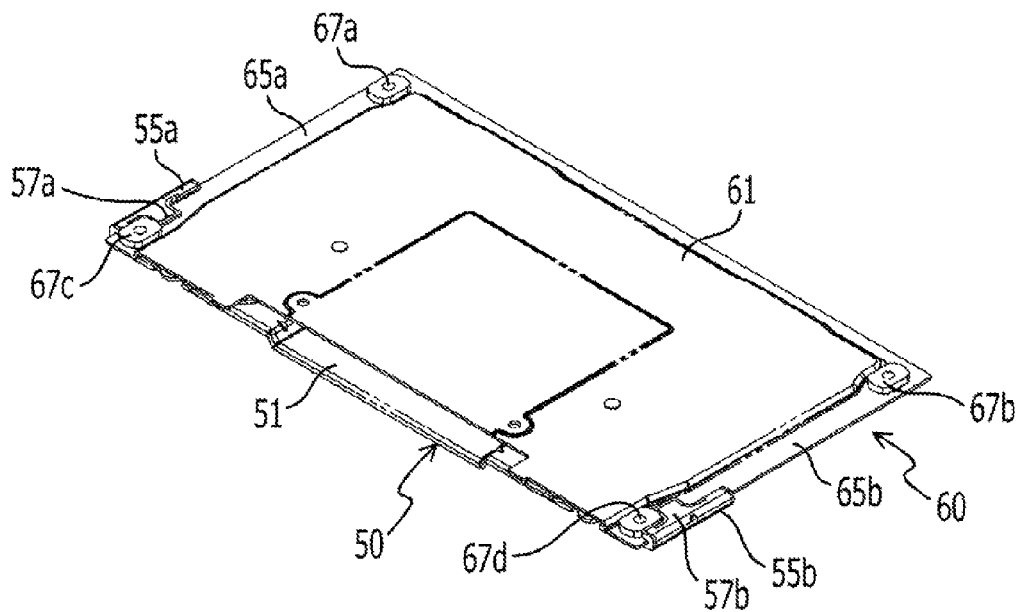
FIGS. 5A and 5B are illustrations of the fixed plate and the sliding plate when the mobile phone is in an open state.
Figure 5B:
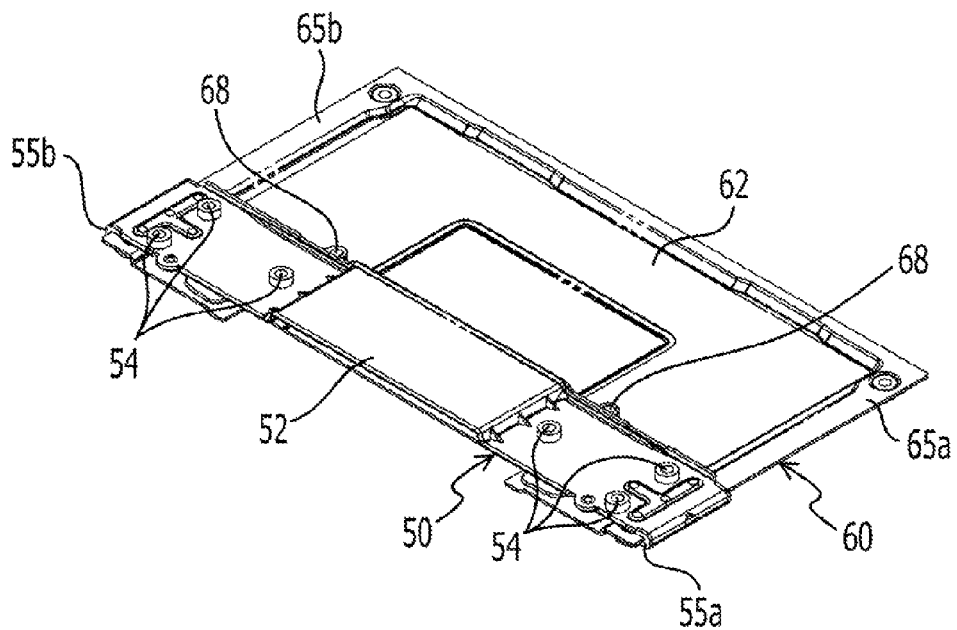

The fixed plate 50 and the sliding plate 60 will be described in detail. FIGS. 4A and 4B are illustrations of the fixed plate 50 and the sliding plate 60 when the mobile phone 1 is in the closed state. FIGS. 5A and 5B are illustrations of the fixed plate 50 and the sliding plate 60 when the mobile phone 1 is in the open state. FIGS. 4A and 5A are perspective views of the fixed plate 50 and the sliding plate 60 as seen from the side of the slide plate 60. FIGS. 4B and 5B are perspective views of the fixed plate 50 and the sliding plate 60 as seen from the side of the fixed plate 50.

The sliding plate 60 has a first surface 61 and a second surface 62. The first surface 61 is fixed to the rear surface 22 of the housing 20. The fixed plate 50 is connected to the second surface 62. The fixed plate 50 has a first surface 51 and a second surface 52. The first surface 51 faces the second surface 62 of the sliding plate 60. The second surface 52 is fixed to the front case 10F.

The sliding portions 65a and 65b are respectively formed at both shorter sides of the sliding plate 60. Holding portions 55a and 55b for holding the sliding portions 65a and 65b of the sliding plate 60 are formed at both ends of the fixed plate 50 so that the holding portions 55a and 55b respectively grasp the sliding portions 65a and 65b. Stopper portions 57a and 57b are respectively formed at front ends of the holding portions 55a and 55b. The sliding portions 65a and 65b are slidably coupled to the holding portions 55a and 55b. Thereby, the sliding plate 60 slides with respect to the fixed plate 50 in a direction along the shorter sides of the sliding plate 60.

Stoppers 67a to 67d are respectively provided at each corner of the first surface 61 of the sliding plate 60. The stoppers 67a and 67c are respectively provided at each end of the sliding portion 65a. The stoppers 67b and 67d are respectively provided at each end of the sliding portion 65b. The stoppers 67a to 67d are fixed to the sliding plate 60 by screws.

The stopper portions 57a and 57b having electrical conductivity are provided to the fixed plate 50. The stopper portions 57a and 57b are electrically connected to the ground layer of the printed board 10P via the fixed plate 50 and the terminal portion T11. Therefore the stopper portions 57a and 57b are an example of a first stopper. The stoppers 67a to 67d having electrical conductivity are provided to the sliding plate 60. The stoppers 67a to 67d are electrically connected to the ground layer of the printed board 20P via the terminal portions T21 to T23 and the sliding plate 60. The stoppers 67a and 67b define one end of the sliding range by coming into contact with the stopper portions 57a and 57b as described below. Therefore, the stoppers 67a and 67b are an example of a second stopper. On the other hand, the stoppers 67c and 67d defines the other end of the sliding range by coming into contact with the stopper portions 57a and 57b as described below. Therefore, the stoppers 67c and 67d are an example of a third stopper.

As shown in FIG. 4B, a plurality of screw holes 54 are formed on the second surface 52 of the fixed plate 50. Screws for fixing the fixed plate 50 to the metal plates 30a and 30b are screwed into the screw holes 54. The center portion of the fixed plate 50 is elevated. The elevated portion fits into the opening OP2 of the front case 10F shown in FIG. 3. Two bias members 80 are provided on the second surface 62 of the sliding plate 60. One end of the bias member 80 is connected to the fixed plate 50 and the other end is connected to the sliding plate 60. Specifically, a pin portion 68 is formed on the second surface 62 of the sliding plate 60 and the other end of the bias member 80 is connected to the pin portion 68. The bias member 80 has a function for biasing the sliding plate 60 from a middle position of the sliding range to one end or the other end of the sliding range. The bias member 80 is a torsion spring, but not limited to this. In FIGS. 4A and 4B, the detailed shape of the bias member 80 is omitted.

In the closed state, contact between the stopper 67a and the stopper portion 57a and contact between the stopper 67b and the stopper portion 57b are maintained by biasing forces of the bias members 80. Thereby, the fixed plate 50 is electrically connected with the sliding plate 60. The stopper portions 57a and 57b respectively come into contact with the stoppers 67a and 67b, and thereby one end of the sliding range of the sliding plate 60 with respect to the fixed plate 50 is defined.

When the closed state is transitioned to the open state, the housing 20 is operated to slide with respect to the housing 10 against the biasing forces of the bias members 80. When the housing 20 is operated in such a manner, the bias members 80 bias the housing 20 so that the housing 20 is returned to the closed state from the one end of the sliding range to a middle position of the sliding range, and bias the housing 20 so that the housing 20 is transferred to the open state from the middle position of the sliding range to the other end of the sliding range. In this way, the bias members 80 switch the direction of biasing the sliding plate 60 at the middle position of the sliding range.

When the housing 20 is operated to slide from the closed state, the stopper portions 57a and 57b respectively detach from the stoppers 67a and 67b. The holding portions 55a and 55b of the fixed plate 50 respectively slide on the sliding portions 65a and 65b of the sliding plate 60. When the fixed plate 50 moves to the middle position of the sliding range, the bias members 80 switch the direction of biasing the sliding plate 60 and bias the sliding plate 60 to be the open state. According to the biasing forces of the bias members 80, the holding portions 55a and 55b respectively approach the stoppers 67c and 67d, and then, as shown in FIG. 5A, the stopper portions 57a and 57b respectively come into contact with the stoppers 67c and 67d. As shown in FIGS. 4B and 5B, the bias members 80 are arranged between the fixed plate 50 and the sliding plate 60 so that the bias members 80 do not interfere with the fixed plate 50 and the sliding plate 60.

Also in the open state shown in FIG. 5A, contact between the stopper portion 57a and the stopper 67c and contact between the stopper portion 57b and the stopper 67d are maintained by the biasing forces of the bias members 80. Thereby, it is secured that the fixed plate 50 is electrically connected with the sliding plate 60. The stopper portions 57a and 57b respectively come into contact with the stoppers 67c and 67d, and thereby the other end of the sliding range of the sliding plate 60 with respect to the fixed plate 50 is defined.

In this way, the sliding range of the housing 20 with respect to the housing 10 is defined by the stopper portions 57a and 57b and the stoppers 67a to 67d. As described above, the stopper portions 57a and 57b and the stoppers 67a to 67d have electrical conductivity. Thereby, the stopper portions 57a and 57b are electrically connected to the ground layer of the printed board 10P accommodated in the housing 10, and the stoppers 67a to 67d are electrically connected to the ground layer of the printed board 20P accommodated in the housing 20. Thereby, when the stopper portion 57a or the stopper portion 57b comes into contact with any one of the stoppers 67a to 67d, the stopper portion 57a or the stopper portion 57b is electrically connected to the ground layers of the printed boards 10P and 20P. In other words, the stoppers 67a to 67d have a function for defining the sliding range, so the ground layers of the printed boards 10P and 20P are electrically connected to each other in the open state and in the closed state.

In this way, the stopper portions 57a and 57b and the stoppers 67a to 67d have a function to define the sliding range of the housing 20 with respect to the housing 10 as well as to connect the ground of the housing 10 with the ground of the housing 20. Therefore, the number of components in the mobile phone 1 of the present embodiment is reduced, compared with a case in which the stoppers for defining the sliding range and the electrically conductive member for connecting the grounds of the housings 10 and 20 together are separately provided.

The contact between the stopper portions 57a and 57b and the stoppers 67a to 67d is maintained by using the biasing direction of the bias members 80. The bias members 80 have a function for assisting the sliding of the housing 20 with respect to the housing 10, so the biasing force of the bias members 80 is relatively large. Therefore, the contact between the stopper portions 57a and 57b and the stoppers 67a to 67d is reliably maintained. Thereby, the difference between the potential of the ground layer of the printed board 10P, the metal plates 30a and 30b, and the fixed plate 50 and the potential of the ground layer of the printed board 20P and the sliding plate 60 is suppressed.

As described above, the antenna ANT for performing wireless communication is provided in the housing 20. Therefore, if the difference between the potential of the ground layer of the printed board 10P and the like provided in the housing 10 and the potential of the ground layer of the printed board 20P and the like provided in the housing 20 are large, the wireless communication using the antenna ANT may be affected by the large difference between the potentials. In the present embodiment, the stopper portions 57a and 57b reliably come into contact with the stoppers 67a to 67d by the biasing force of the bias members 80, so the problem as described above is inhibited and/or prevented from occurring.

The stopper portions 57a and 57b and the stoppers 67a to 67d, which can come into contact with each other, are made of a metal, so the durability is improved.

It is not required that all the stoppers 67a to 67d have electrical conductivity. For example, only the stoppers 67a and 67b may be formed of an electrically conductive material, and the stoppers 67c and 67d may be formed of a material having no electrical conductivity (for example, a synthetic resin). In this case, only when the mobile phone 1 is in the closed state, the ground layers of the printed boards 10P and 20P are electrically connected to each other. Further, only the stoppers 67c and 67d may be formed of an electrically conductive material, and the stoppers 67a and 67b may be formed of a material having no electrical conductivity. In this case, only when the mobile phone 1 is in the open state, the ground layers of the printed boards 10P and 20P are connected to each other. In these cases, whether the mobile phone 1 is in the open state or in the closed state can be determined by detecting the potential of the ground layer of either one of the printed boards 10P and 20P and using the change of the potential.

Further, only one of the stoppers 67a and 67b may have electrical conductivity. Further, only one of the stoppers 67c and 67d may have electrical conductivity.

Although a preferred embodiment of the present invention has been described in detail, the present invention is not limited to the specific embodiment, but various changes and modifications are possible within the scope of the gist of the present invention.

In the embodiment described above, a mobile phone has been described as an example of the mobile device. However, the mobile device only has to have two housings that are slidably coupled to each other, and for example, the mobile device may be a computer, an electronic dictionary, a PDA (Personal Digital Assistant), a game machine, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A mobile device comprising:
 a first housing;
 a second housing slidably coupled to the first housing in a sliding range;
 a bias member to bias the second housing from a middle position of the sliding range to one end of the sliding range;
 a first stopper provided on the first housing, connected to a ground of the first housing, and having electrical conductivity; and a second stopper provided on the second housing, having electrical conductivity, and being configured to come into contact with the first stopper to define the one end of the sliding range, wherein the first stopper includes a pair of stoppers, and the second stopper includes a pair of stoppers corresponding to the pair of stoppers of the first stopper.

2. The mobile device according to claim 1, further comprising:

a third stopper having electrical conductivity, fixed to the second housing, and being configured to come into contact with the first stopper to define the other end of the sliding range.

3. The mobile device according to claim 1, further comprising:

an antenna provided in the second housing.

4. The mobile device according to claim 1, wherein the first stopper is electrically connected to a ground layer of a printed board accommodated in the first housing.

5. The mobile device according to claim 1, wherein the first housing has an operation unit whose exposure state changes according to sliding of the second housing with respect to the first housing.

6. The mobile device according to claim 1, wherein the second housing has a display exposed without sliding the second housing with respect to the first housing.

\* \* \* \* \*